Figure 1:
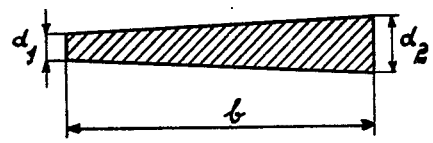

March 22, 1955 E. L. LAHAYE 2,704,396

METHOD OF MANUFACTURING THIN STRIP-SHAPED MATERIAL

Filed June 15, 1949 2 Sheets-Sheet 1

INVENTOR.
EUGENE LAMBERT LAHAYE
BY

AGENT

March 22, 1955        E. L. LAHAYE        2,704,396

METHOD OF MANUFACTURING THIN STRIP-SHAPED MATERIAL

Filed June 15, 1949        2 Sheets-Sheet 2

INVENTOR
EUGENE LAMBERT LAHAYE
BY *Fred M. Vogel*
AGENT

United States Patent Office 2,704,396
Patented Mar. 22, 1955

2,704,396

METHOD OF MANUFACTURING THIN STRIP-SHAPED MATERIAL

Eugène Lambert Lahaye, Eindhoven, Netherlands, assignor to Hartford National Bank and Trust Company, Hartford, Conn., as trustee Application June 15, 1949, Serial No. 99,242

Claims priority, application Netherlands June 16, 1948

1 Claim. (Cl. 29—556)

This invention relates to methods of manufacturing thin strip-shaped material and to strip-shaped material manufactured by such methods.

It is common practice to reduce the thickness of strip-shaped material, such as metal sheet, to the desired value by one or more rolling operations. In order to obtain uniformity of thickness, the final rolling operation is sometimes carried out with the use of rollers, the surfaces of which are finished very accurately considerable care being taken in positioning the rollers exactly parallel to one another. The differences in thickness occurring even then in the direction of width of the strip-shaped material and ranging between 0.01 and 0.02 mm., are negligible for certain uses but for other uses it is desirable that these thickness differences should be further reduced. However, this is not readily possible with the methods hitherto employed in manufacturing strip-shaped material.

The present invention permits of materially reducing the thickness differences occurring in rolled strip-shaped material.

According to the invention, in a method of manufacturing strip-shaped material, the thickness of the material is first reduced by one or more rolling operations and both surfaces of the material are then subjected simultaneously to a shaving operation at directly opposite parts of the strip.

By following this procedure, that is to say by carrying out a shaving operation subsequent to the rolling operations it is possible to reduce the differences in thickness of the strip-shaped material to values materially lower than the values obtainable in practice hitherto. With the use of the method according to the invention, differences in thickness of the strip-shaped material in its direction of width of, for example, 0.005 mm. and even smaller thicknesses ranging in value between 0.0005 and 0.001 mm. may be realized. The differences in thickness occurring in the direction of length of the strip-shaped material may be slightly larger, because as a rule manufacture of this material is started with reels of strip-shape material the length of which is tens of times larger than the width. Nevertheless, the differences in thickness in the direction of length remain very small; measurements have shown that with the use of the method according to the invention the differences in thickness in the direction of length per meter of the material remain, as a rule, below a value of approximately 2 to 5 times the differences in the direction of width.

The minute differences in thickness in the strip-shaped material manufactured with the use of the method according to the invention may permit of this material being used in all sorts of devices and apparatus in which hitherto such use was not possible. For example, in the manufacture of variable condensers for use in electrical apparatus it has been found that the use of material according to the invention for manufacturing plates for stators and rotors of such condensers permits of realizing condenser constructions the external dimensions of which are materially smaller than those of the constructions hitherto known.

The shaving operation in the method according to the present invention does not tend in the first place to reduce the thickness of the strip-shaped material at all areas, which purpose is served by the rolling operations preceding the shaving operation. The shaving operation is intended to reduce local differences in thickness. This explains why the thickness of the shavings is generally very small. At the area at which the surface of the strip-shaped material is subjected to the shaving operation, this thickness is preferably, not more than 0.02 mm.

By subjecting directly opposite parts of the surfaces of the strip simultaneously to the shaving operation, the strip-shaped material is protected from deformation due to the chisel pressure.

The device for carrying out the method according to the invention will generally be constructed to be such that the chisels arranged directly opposite one another are relatively adjustable.

In order that the invention may be more clearly understood and readily carried into effect, it will now be described more fully with reference to the accompanying diagrammatic drawing.

Figure 4:
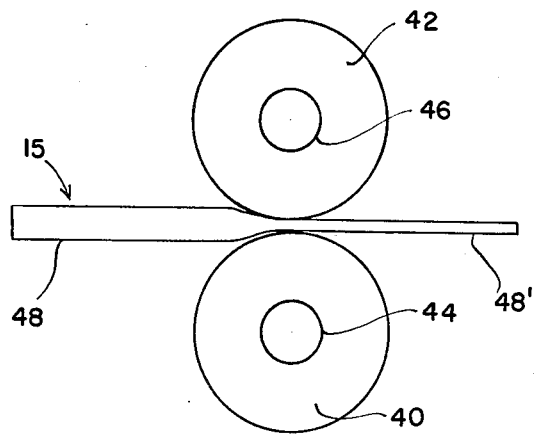

Fig. 1 is a cross-sectional view, not to scale, of strip-shaped metal, for example, brass strip, manufactured by the means hitherto known. The strip-shaped metal 15 may have been rolled as shown in Figure 4. The material to be worked is fed as indicated at 48 between two rollers 40 and 42, which are mounted on shafts 44 and 46 respectively. These rollers reduce the thickness of the strip as indicated at 48' producing the shape indicated in Figure 1. The width $b$ of the material is, say, 70 mm. It may be seen from Fig. 1 that this material has a slightly wedge-shaped sectional area, on the left-hand side of the figure the material-thickness, which should be 0.5 mm. being in actual fact, for example, 0.49 mm., whereas on the right-hand side of the figure the thickness $d_2$, being 0.51 mm. instead of 0.5 mm. There is therefore a difference of 0.02 mm. between the thicknesses $d_1$ and $d_2$. By most accurate adjustment of the rollers used for the manufacture of this material, this difference in thickness might be reduced to 0.01 mm., but a further material reduction of these differences in thickness is impossible with the use of the devices employed hitherto.

Figure 3:
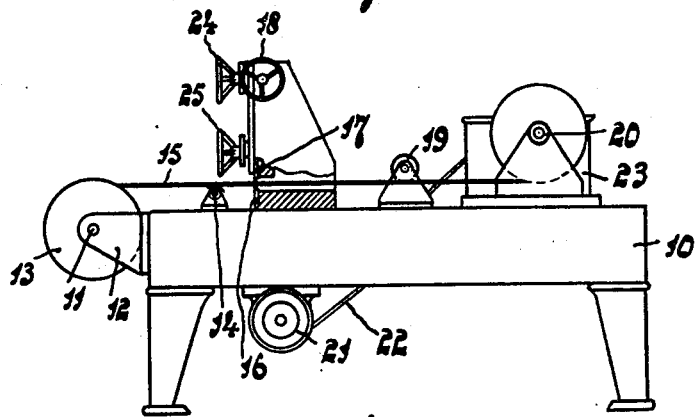

Further reduction of this difference in thickness is obtained according to the present invention, by carrying out a shaving operation subsequent to the rolling operations, and use may be made of the device shown in Fig. 3 for the said shaving operation.

Figure 2:
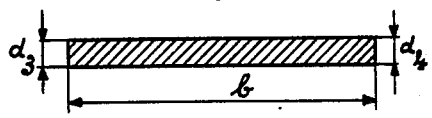

First, Fig. 2 shows the strip-shaped material that may result upon carrying out the method according to the invention. In this figure the starting material is that shown in Fig. 1, the difference in thickness in the direction of width being therefore 0.02 mm. Chisels 16 and 17 provided in the device shown in Fig. 3 are adjusted in such manner that on the left-hand side of the cross-sectional area of the material of Fig. 1 they remove only 0.001 mm., so that the thickness $d_3$ in Fig. 2 becomes 0.489 mm. The difference in thickness $d_4-d_3$ may be reduced to 0.001 to 0.002 mm., the shaving operation reducing the thickness $d_4$ of the strip on the right-hand side of the cross-sectional area to 0.490 to 0.491 mm. This difference in thickness ($d_4-d_3$) may, if desired, be still further reduced for example, to 0.0004 to 0.0005 mm. In the present case the strip-shaped material in Fig. 1 is assumed to be wedge-shaped. If the strip-shaped material should exhibit a cross-sectional area different from that shown in Fig. 1 (which, however, will not often be the case in practice) the same result is obtainable.

A device in which the shaving operation may be carried out will now be described more fully with reference to Fig. 3. The device is mounted on a table 10; 11 designates a shaft, which is supported by the table 10 with the use of arms 12. Seated on this shaft 11, so as to be free to turn, is a reel 13 of the rolled strip-shaped material required to be shaved. This reel comprises for example 100 m. of strip-shaped brass. This strip-shaped material 15 is guided over a guide roller 14 between chisels 16 and 17, which are positioned so as to be directly opposite one another. The chisel 16 is secured to the table 10; the chisel 17 is adapted to be adjusted vertically with the use of a hand wheel 18. The relatively parallel position of the chisels 16 and 17 may be adjusted with the use of gear wheels 24 and 25. After the surface of the strip-shaped material 15 has been subjected to the shaving operation, the material 15 may be guided over a guide roller 19 so as to be wound on a winding shaft 20. The shaft 20 is driven with the use of a motor 21, a pulley 22 and a worm gear 23. In this embodiment, the strip-shaped material 15 is passed between the chisels 16 and 17 at a rate of about 70 m. per minute.

What I claim is:

A method of manufacturing strip-shaped metal material of reduced thickness and parallel edges, said metal material having a width of approximately 70 mm. comprising reducing the thickness of said strip-shaped material by a rolling operation, and thereafter shaving one surface of said material while simultaneously shaving the opposite surface of said material at opposite sides thereof and at directly opposite regions parallel to the longitudinal axis of said strip-shaped metal to produce shavings of not more than 0.02 mm. thereby diminishing the variations of thickness of said rolled stock to variations of thickness of said strip-shaped metal of less than 0.005 mm.

References Cited in the file of this patent

UNITED STATES PATENTS

| | | |
|---|---|---|
| 222,483 | Forrester | Dec. 9, 1897 |
| 1,271,703 | Guibert | July 9, 1918 |
| 1,832,719 | McBerty | Nov. 17, 1931 |
| 1,861,670 | Wagner et al. | June 7, 1932 |
| 2,009,884 | Free | July 30, 1935 |
| 2,086,857 | Derby | July 13, 1937 |
| 2,203,319 | Anderson | June 4, 1940 |
| 2,216,539 | Massee | Oct. 1, 1940 |
| 2,220,182 | Titus | Nov. 5, 1940 |